(No Model.)

J. COLLINS.
Wagon for Gaseous Liquid Fountains.

No. 231,539.   Patented Aug. 24, 1880.

WITNESSES:
Chas. Nida,
C. Sedgwick.

INVENTOR:
J. Collins,
BY Munn & Co.
ATTORNEYS.

N. PETERS, PHOTO-LITHOGRAPHER, WASHINGTON, D C.

UNITED STATES PATENT OFFICE.

JOHN COLLINS, OF BROOKLYN, NEW YORK.

WAGON FOR GASEOUS-LIQUID FOUNTAINS.

SPECIFICATION forming part of Letters Patent No. 231,539, dated August 24, 1880.

Application filed June 21, 1880. (No model.)

*To all whom it may concern:*

Be it known that I, JOHN COLLINS, of Brooklyn, in the county of Kings and State of New York, have invented a new and useful Improvement in Wagons for Gaseous-Liquid Fountains, of which the following is a specification.

Figure 1:
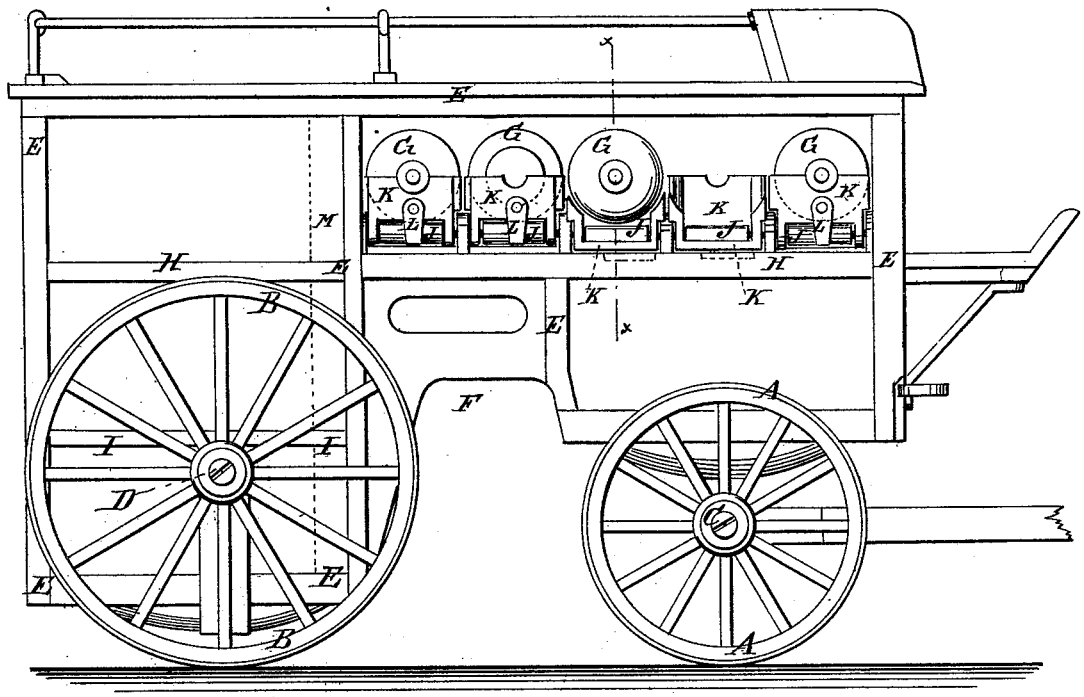
Figure 2:
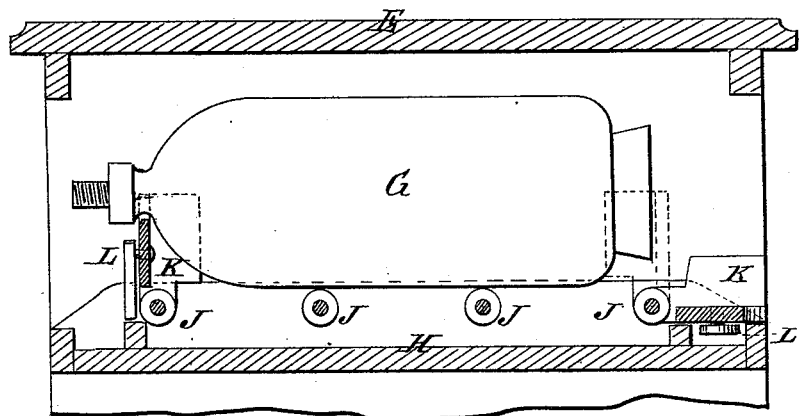

Figure 1 is a side elevation of the improvement. Fig. 2 is a sectional elevation taken through the line $x\ x$, Fig. 1.

Similar letters of reference indicate corresponding parts.

The object of this invention is to furnish wagons for mineral water and other gaseous-liquid fountains, so constructed that the fountains can be readily placed in and removed from the wagon, and will be held securely in place while being carried, and which shall be simple in construction, neat in appearance, strong, durable, and not liable to get out of order.

The invention consists in the hinged clamps constructed with side flanges and having suitable fastenings, in combination with the rollers and the body-frame of the wagon, to secure the fountains in place and serve as guides to the fountains when being put in and taken out, as will be hereinafter fully described.

A represents the forward wheels; B, the rear wheels; C, the forward axle, and D the rear axle.

E is the frame or body of the wagon, the forward part of which is connected with the forward axle, C, by a bolster and king-bolt, a fifth-wheel, or a platform.

The rear part of the body E rests upon and is connected with the rear axle, D, which is bent twice at right angles near each end, so that the said rear part of the body E will be supported below the axis of the rear wheels. The bottom of the rear part of the body E is thus at a lower level than the bottom of the forward part, so as to give greater stability to the wagon and give a greater storage-space for the fountains. Springs may be interposed between the body E and the axles C D, if desired. The lower middle part of the body E is cut away to form a space, F, to receive the forward wheels when the wagon is cramped in turning. The forward part of the body E is made of sufficient height to receive two fountains when placed one above the other, and is divided centrally by a horizontal partition, H, which extends the entire length of the body E. In the rear lower part of the body E is formed a second horizontal partition, I, extending forward from the rear end of the said body for a distance equal to the length of a fountain.

With this construction there will be two tiers of fountains in the forward part of the body E—one tier in the middle part and three tiers in the rear part. The fountains G in the forward and middle parts of the body E are placed transversely, so as to be put in and taken out at either side of the wagon; and in the rear part of the body E the fountains are placed longitudinally, so as to be put in and taken out at the rear end of the wagon. The fountains G of each tier are placed side by side, but not in contact, so that any one fountain can be taken out and put in without disturbing the others. Each fountain rests upon a number of short horizontal rollers, J, pivoted to the bars of the frame-work of the wagon-body, or to supports or bearings attached to the said frame-work, so that the said fountains can be moved easily when being put in and taken out. Each fountain G is secured in place by clamps K, which are hinged at their lower corners to the journals of the outer rollers, J, so that when turned down they may rest in a horizontal or slightly inclined position upon the side bars of the frame E.

Upon the inner sides of the side edges of the clamps K are formed flanges to overlap the sides of the ends of the fountains and thus hold them securely in position. The upper edges of the middle parts of the clamps K are recessed to receive the necks of the fountains G.

The inner edges of the flanges of the clamps K are beveled, as shown in Fig. 1, to prevent the said edges from rubbing or marring the sides of the fountains when the said fountains are being put in and taken out.

With this construction the clamps K serve as guides when inserting and removing the fountains. The clamps K are secured in place, when turned up, by buttons L, pivoted to the said clamps, and which, when turned down, rest against the outer rollers, J; or the clamps K may be secured by other suitable fastenings.

The transverse fountains G have a clamp, K, at each end, so that they can be put in and taken out at either side of the wagon.

The longitudinal fountains G have clamps K at their outer ends only, their inner ends resting against triangular cleats M attached to the body-frame E.

Having thus described my invention, what I claim as new, and desire to secure by Letters Patent, is—

In a wagon for gaseous-liquid fountains, the hinged clamps K, constructed with side flanges and having fastenings L, in combination with the rollers J and the body-frame E of the wagon, substantially as herein shown and described, to secure the fountains in place and serve as guides to the fountains when being put in and taken out, as set forth.

JOHN COLLINS.

Witnesses:
JAMES T. GRAHAM,
C. SEDGWICK.